Feb. 16, 1965   G. E. NALDER   3,169,335
DEVICE FOR FISHING
Filed Sept. 9, 1963   2 Sheets-Sheet 1

INVENTOR
G. E. NALDER
By
Atty

Feb. 16, 1965  G. E. NALDER  3,169,335
DEVICE FOR FISHING
Filed Sept. 9, 1963  2 Sheets-Sheet 2
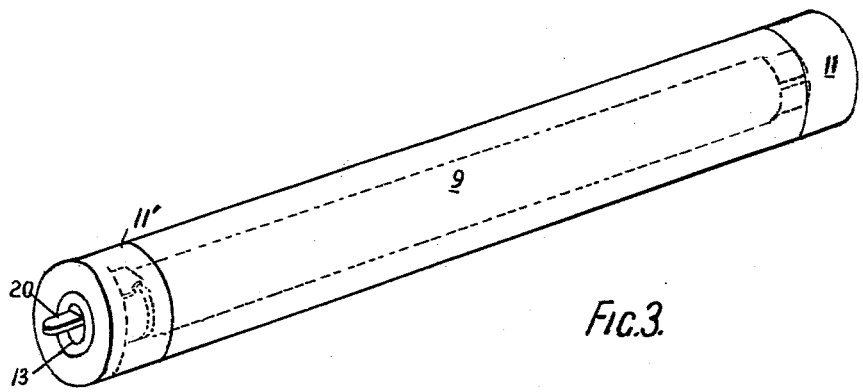
Fig. 3.
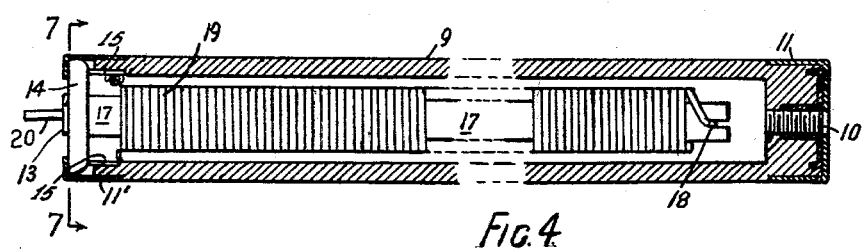
Fig. 4.
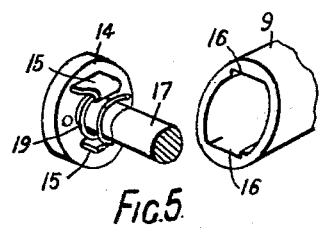
Fig. 5.
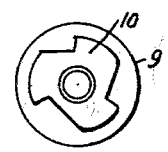
Fig. 6.
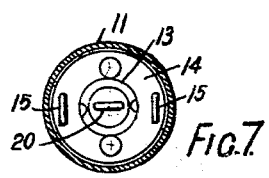
Fig. 7.
INVENTOR
G. E. NALDER
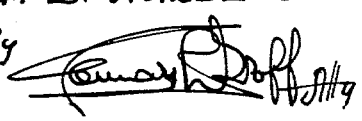

United States Patent Office 3,169,335
Patented Feb. 16, 1965

3,169,335
DEVICE FOR FISHING
Gerald Ebsworth Nalder, 37 Kingslangley Road,
Greenwich, New South Wales, Australia
Filed Sept. 9, 1963, Ser. No. 307,580
3 Claims. (Cl. 43—15)

This invention has been devised to provide a device for fishing which can be mounted upon a support and which can be set for automatic retraction of line wound thereon after the line has been lowered into the water.

According to the invention, the device comprises a frame rotatably mounted on a base and upstanding therefrom, a roller rotatably mounted transversely in the frame and a reel fixed on the roller. The reel has fishing line thereon and the frame has a guide thereon for the fishing line. The roller has a retracting spring therein and a winding handle for the roller is rotatable in the frame. Stop means on the reel and on the frame can be set manually to hold the roller in a desired position against retraction when the roller has been rotated in a direction tensioning said spring and being automatically released upon further tension being applied to the spring.

The invention will be described with reference to the annexed drawings wherein:

FIGURE 3 is a perspective view of the roller;

FIGURE 4 is a longitudinal sectional elevation of the roller;

FIGURE 5 is an exploded detail perspective view of the bearing supporting end of the roller;

FIGURE 6 is an end view of the winding handle end of the roller, and

FIGURE 7 is an end view, partly in section, taken along the line 7—7 of FIGURE 4.

Figure 1:
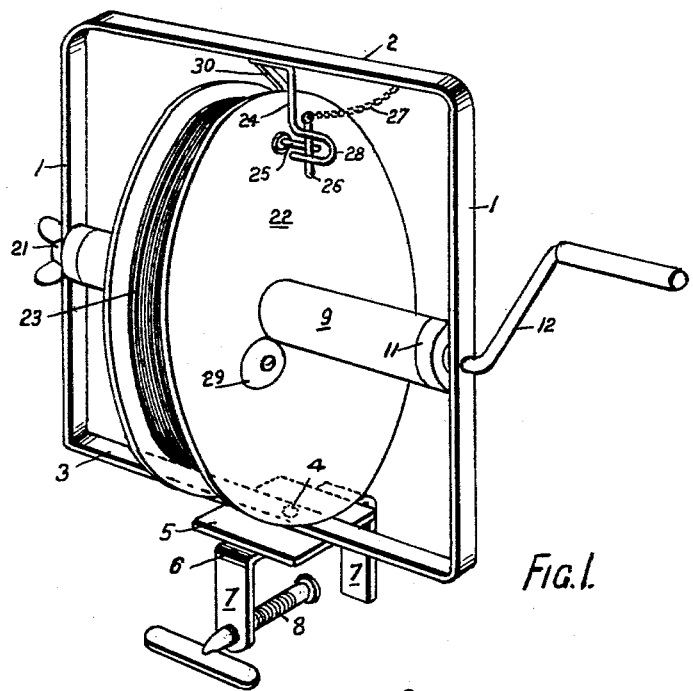
FIGURE 1 is a perspective view of the device showing the stop means applied to the reel.
Figure 2:
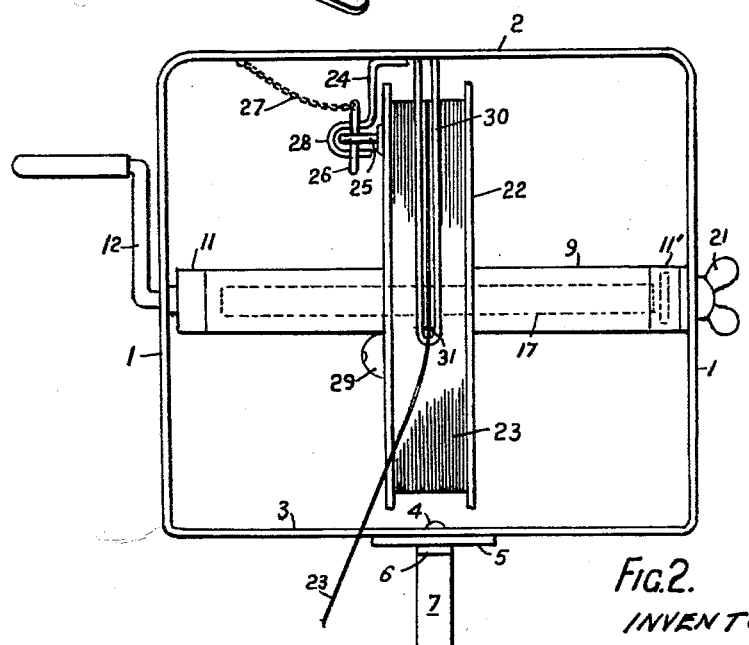
FIGURE 2 is an elevational view thereof on an enlarged scale.

The frame is substantially square and consists of vertical side members 1, a top member 2 and a bottom member 3. The bottom member 3 is rotatably mounted by spindle 4 on a mounting plate 5 which latter is fixed to the base part 6 of a U-shaped mounting bracket 7. The bracket 7 has thumb screw 8 mounted in one of its limbs whereby the device can be mounted on a support.

A roller 9 is mounted medially transversely in the side members 1. As illustrated, one end of the roller 9 has a screwed socket 10 fixed axially therein and has an axially bored cap member 11 fixed thereover. A winding handle 12 is fixed in the socket 10 and projects therefrom, said handle 12 being rotatable in one of the side members 1. From its other end, the roller 9 is bored substantially throughout its length and has a bearing 13 fixed in this end. The bearing 13 has a flanged extension 14 which abuts the end of the roller 9 when the bearing 13 is mounted in the roller 9. A cap member 11' fits over the extension 14 and is secured to the end of roller 9. The extension 14 has catch members 15 fixed thereon for location in slots 16 formed in the end of the roller 9, whereby the bearing 13 is non-rotatably fixed in the roller 9. The bearing 13 rotatably supports one end of a spring tensioning rod 17. The rod 17 is located substantially within the entire length of the bore of the roller 9 and it is slotted at its inner end as at 18. A helical roller retracting spring 19 is mounted on the rod 17 and it has one end fixed in the slot 18 and the other end thereof is fixed to one of the catch members 15. The rod 17 has an outwardly extending flat winding key 20 fixed thereon which projects through a conventional, vertically disposed keyhole slot (not shown) formed in the other side member 1, and a winding member 21 is mounted on the key 20. A reel 22 is fixed substantially medially on the roller 9 and it has fishing line 23 thereon.

The stop means are formed from three members comprising a downwardly projecting member 24 fixed to the top member 2 within the frame above the reel 22, a reel stop-pin 25 fixed in one side of the reel 22 and projecting outwardly therefrom, and an abutment stop-pin 26 loosely suspended by a chain 27 or the like from the top member 2 within the frame. The downwardly projecting member 24 is formed with a reverse C-shaped part 28 and the reel stop-pin 25 passes between the limbs of the C-shaped part 28 during rotation of the reel 22. A line anchor 29 for the line 23 is fixed as desired on the reel 22.

The guide 30 is a U-shaped member located over the centre of the reel 22 and fixed by the free ends of the limbs to the top member 2 of the frame, said guide 30 being preferably bent in the form of a part circle conforming to the periphery of the reel 22 and having, if desired, a guide eyelet 31 fixed therein, through which the line passes.

In use the line 23 is wound from the reel 22 as desired and hence the roller retracting spring 19 is tensioned. The roller 9 is then set by placing the abutment stop-pin 26 between the reel stop-pin 25 and the C-shaped part 28 of the downwardly projecting member 24 and the abutment stop-pin 26 is held in this position by spring tension. A pull on the line 23 will move the roller 9 so that the reel stop-pin 25 moves away from the downwardly projecting member 24. Simultaneously the abutment stop-pin 26 falls by its own weight away from the downwardly projecting member 24 and the roller 9 is retracted by its spring 19 and the line 23 is re-wound onto the reel 22.

The frame rotates upon the mounting plate 5 according to the direction of the line 23 as said line 23 is being wound in. Also, tension on the spring 19 can be adjusted by lifting the the key 20 out of the holding part of the keyhole slot in which said key 20 is normally located, and rotating the rod 17 accordingly, under the control of the winding member 21.

I claim:

1. A device for fishing, said device comprising, in combination, a frame rotatably mounted upon a mounting bracket and upstanding therefrom, a roller rotatably mounted transversely in the frame, a reel fixed on the roller, said reel having fishing line wound thereon, a winding handle for the roller rotatable in the frame, a roller retracting spring in the roller, stop means on the reel and on the frame, said stop means being set manually to hold the roller in a desired position against retraction when said roller has been rotated in a direction tensioning said spring and being automatically released upon further tension being applied to the spring, said stop means comprising a downwardly projecting member fixed to the frame above the reel and projecting downwardly in juxtaposition to one side of said reel, a reel stop-pin fixed in said one side of the reel and projecting outwardly therefrom above the lower end of said downwardly projecting member, and an abutment stop-pin loosely suspended from the top of and within the frame, said downwardly projecting member being formed to permit unrestricted movement of the reel stop-pin during rotation of the reel, said abutment stop-pin being located between the downwardly projecting member and the reel stop-pin when it is desired to hold the roller and reel stationary with the roller retracting spring tensioned, and a guide member on the frame for the fishing line.

2. A device for fishing according to claim 1, wherein the downwardly projecting member is formed with a reverse C-shaped portion providing spaced apart limbs and the reel stop-pin passes between the limbs of said C-shaped portion during rotation of the reel.

3. A device for fishing according to claim 1, wherein the guide member is a U-shaped member fixed by the free ends of its limbs to the frame above the reel and projecting downwardly centrally relative to the sides of the reel.

References Cited by the Examiner

UNITED STATES PATENTS

| 188,171 | 3/77 | Morse | 242—107 |
| 1,524,011 | 1/25 | Ballew | 43—15 |
| 2,028,311 | 1/36 | Berry | 43—20 |
| 2,679,709 | 6/54 | Du Bois | 242—107.7 |
| 2,791,857 | 5/57 | Schrader | 43—16 |

FOREIGN PATENTS

| 32,344 | 5/21 | Norway. |

ABRAHAM G. STONE, *Primary Examiner.*